United States Patent [19]
Tominaga et al.

[11] Patent Number: 5,908,367
[45] Date of Patent: Jun. 1, 1999

[54] FLOW RATE CONTROL VALVE AND CONTINUOUSLY VARIABLE AUTOMATIC TRANSMISSION PROVIDED WITH SAME

[75] Inventors: Masakazu Tominaga; Masahiro Yamamoto, both of Zama; Yoji Hiraoka, Isehara, all of Japan

[73] Assignee: Nissan Motor Co., Ltd., Yokohama, Japan

[21] Appl. No.: 08/867,759

[22] Filed: Jun. 3, 1997

[30] Foreign Application Priority Data

Jun. 13, 1996 [JP] Japan .................................. 8-152263

[51] Int. Cl.⁶ ..................................................... G05D 11/00
[52] U.S. Cl. ........................... 477/45; 474/8; 137/115.08; 137/115.09
[58] Field of Search ................................... 477/45, 46, 44, 477/121, 143, 156, 158; 137/115.08, 115.09, 504; 474/8, 28

[56] References Cited

U.S. PATENT DOCUMENTS

| | | | |
|---|---|---|---|
| 3,920,035 | 11/1975 | Werner | 137/115.08 X |
| 4,718,306 | 1/1988 | Shigematsu et al. | 477/45 |
| 4,841,814 | 6/1989 | Satoh | 477/45 |
| 5,435,795 | 7/1995 | Mochizuki et al. | 477/39 |
| 5,607,371 | 3/1997 | Yamaguchi | 475/210 |

FOREIGN PATENT DOCUMENTS

| | | |
|---|---|---|
| 63-69791 | 5/1988 | Japan . |
| 7-259944 | 10/1995 | Japan . |
| 8-178055 | 7/1996 | Japan . |

*Primary Examiner*—Charles A. Marmor
*Assistant Examiner*—Ankur Parekh
*Attorney, Agent, or Firm*—Foley & Lardner

[57] ABSTRACT

A fluid is guided inside a spool in which an orifice and drain holes are formed. The spool is displaced according to a hydraulic fluid pressure difference across the orifice. An outflow port, which is always connected with the orifice, and a drain passage, which overlaps with the drain holes according to a displacement position of the spool, are formed in the casing housing the spool. A stopper that limits the spool displacement beyond a position at which the overlap between the drain holes and drain passage is maximized is further provided. In this way, drainage of a fluid via the drain holes and drain passage is maintained at a maximum level even when fluid flows into the spool at a flow rate exceeding a predetermined level, and sharp increases of fluid flow rate from the orifice are thereby suppressed. By limiting excessive displacement of the spool, hysteresis is also prevented from occurring in the flow rate characteristics.

16 Claims, 6 Drawing Sheets

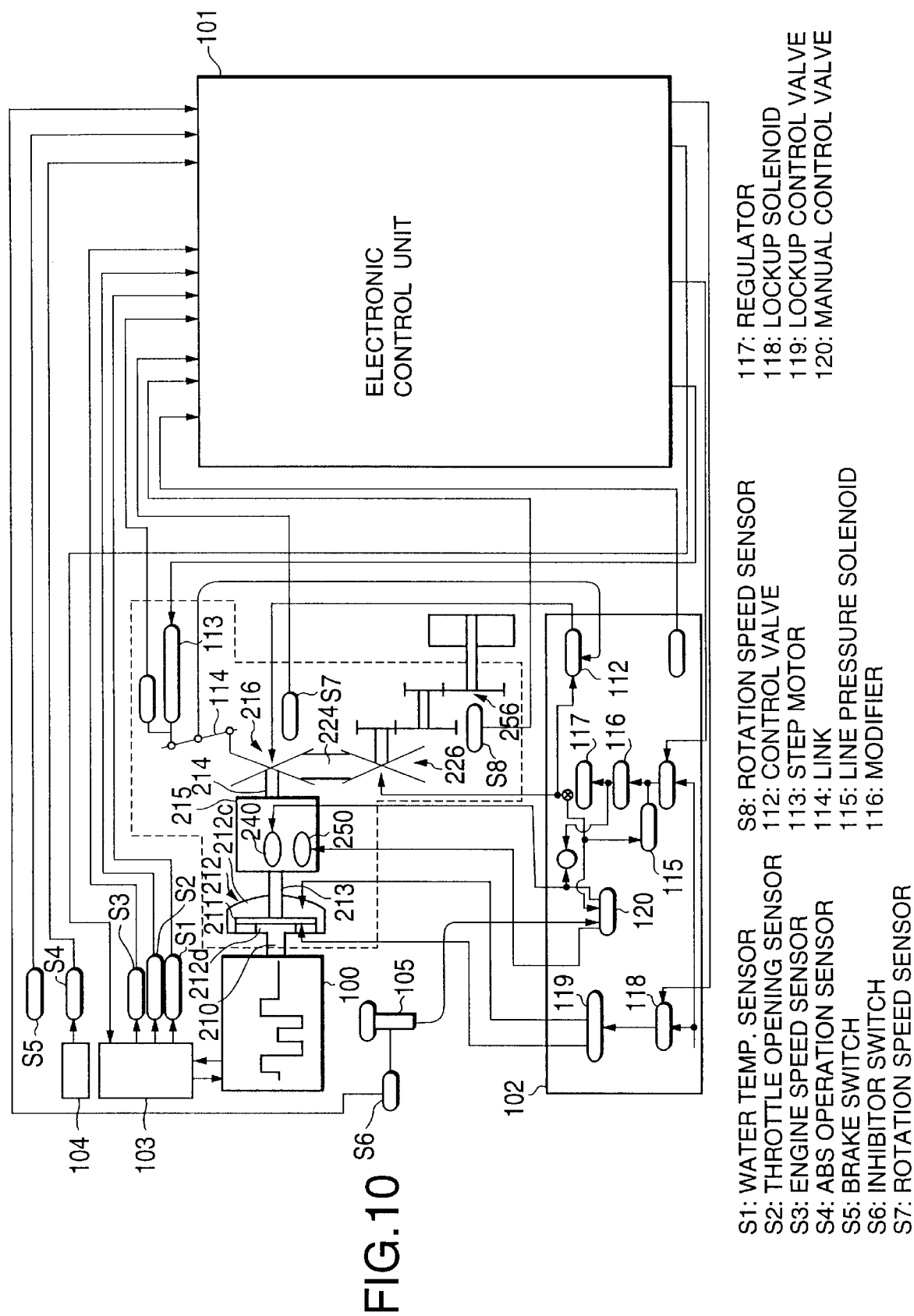

5,908,367

FLOW RATE CONTROL VALVE AND CONTINUOUSLY VARIABLE AUTOMATIC TRANSMISSION PROVIDED WITH SAME

FIELD OF THE INVENTION

This invention relates to a flow rate control valve used for supplying a hydraulic pressure to the automatic transmission of a vehicle.

BACKGROUND OF THE INVENTION

Automatic transmissions that control the speed change operations of a vehicle normally perform gear shifts using a hydraulic pressure. This hydraulic pressure is generated by a hydraulic fluid discharged from an oil pump driven by the engine. A flow rate control valve is provided at a discharge port of the oil pump so as to supply the hydraulic fluid at a flow rate lying within fixed limits to the automatic transmission. This type of flow rate valve may also be applied for providing control pressure to a continuously variable transmission, which is, for example, disclosed in U.S. Pat. No. 5,435,795.

Such a flow rate control valve has a structure that drains excess hydraulic fluid according to the displacement of a cylindrical spool in response to the pressure of the hydraulic fluid. The spool is housed in a casing, and is supported by a spring in a direction opposite to the direction in which the pressure of the hydraulic fluid acts.

The fluid discharged by the pump is led into a space formed in the spool, and then from an orifice formed at the end of the spool. The fluid flows to the automatic transmission via an outflow port formed in the casing.

Drain holes are pierced on the periphery of the spool, which are connected to the interior space of the spool, and drain ports are formed relative to these drain holes in the casing according to a slide position of the spool.

When the discharge pressure of the pump is low, the drain holes and the drain ports do not overlap, so effectively all of the hydraulic fluid is supplied from the orifice to the automatic transmission. As the discharge pressure increases and the spool slides inside the casing, the drain holes and drain ports start to overlap, so part of the hydraulic fluid flows out from the drain ports to the intake side of the oil pump. This outflow amount is larger the higher the discharge pressure, i.e., the higher the discharge flow rate.

The flow rate of hydraulic fluid supplied to the automatic transmission from the orifice is therefore maintained almost constant according to the increase of the drain flow rate as the pump discharge flow rate increases.

However, when the discharge flow rate of the oil pump rises to a high value, the spool displaces beyond the point at which the overlap between the drain holes and drain port is maximized. Beyond this point, the drain flow rate conversely starts to decrease with increase of spool displacement distance. This decrease of drain flow rate causes an increase of orifice flow rate, and the hydraulic fluid flow rate supplied by the flow control valve to the automatic transmission exceeds tolerance limits.

The equilibrium position of the spool is a position in which the spring load is balanced against the pressure difference across the orifice. However, when the effective cross-sectional area of the drain changes over at the point from increasing to decreasing relative to the spool position as described above, there will be two spool positions in which forces are balanced for the same pump discharge flow rate. As a result, even at the same pump discharge pressure, the spool balance position when the discharge pressure is increasing and the spool balance position when the discharge pressure is decreasing will not necessarily be the same, and this may lead to hysteresis of flow rate characteristics of the flow rate control valve.

SUMMARY OF THE INVENTION

It is therefore an object of this invention to suppress an increased flow rate of a hydraulic fluid supplied from a flow rate control valve after a drain cross-sectional area reaches a maximum.

It is a further object of this invention to prevent hysteresis from occurring in the flow rate characteristics of a flow rate control valve.

In order to achieve the above objects, this invention provides a flow rate control valve for an automatic transmission for supplying a hydraulic fluid at a substantially constant flow rate to an automatic transmission by draining part of the fluid supplied from an oil pump.

The flow rate control valve comprises a casing, a spool housed in the casing, a passage for guiding the fluid to the interior of the spool, an orifice connecting with the interior of the spool, the spool displacing inside the casing according to a hydraulic fluid pressure difference across the orifice, an outflow port connected with the orifice, the port being formed in the casing, a drain hole connecting with the passage formed in the spool, a drain passage formed in the casing so as to overlap with the drain hole according to a displacement position of the spool, and a stopper for preventing the spool from displacing beyond a position in which the overlap between the drain hole and the drain passage is a maximum.

It is preferable that the flow rate control valve further comprises a spring for supporting the spool against a pressure according to the pressure difference.

It be further preferable that the stopper is formed in a cylindrical shape having a diameter substantially identical to a diameter of the spool, and the stopper comes in contact with an end part of the spool.

It be still further preferable that the orifice is formed in the end part of the spool, the stopper comprising a passage connecting the orifice and the outflow port, and the spring disposed inside the stopper.

It is also preferable that the stopper comprises a cylindrical part formed in a one-piece construction with the spool extending in a lengthwise direction from one end of the spool, and the casing comprises a contact part that comes into contact with the stopper.

In this case, it be further preferable that the orifice is formed in the end part of the spool, the stopper comprising a passage connecting the orifice and the outflow port, and the spring disposed inside the stopper.

It is also preferable that the stopper comprises a snap ring which is fitted to the casing and comes into contact with the end part of the spool.

It is also preferable that the end part of the spool comprises the orifice and a guide for supporting the spring outside the orifice.

This invention also provides a continuously variable transmission apparatus for transmitting a rotation of an engine to a drive wheel of a vehicle in a ratio according to a vehicle running condition, comprising an automatic transmission for changing the ratio according to a hydraulic pressure, an oil pump driven by the engine, and having a discharge port for providing pressurized fluid to the transmission, the flow rate control valve being fitted to this discharge port, a control valve for increasing or decreasing the hydraulic pressure supplied from the flow rate control valve to the automatic transmission according to a hydraulic pressure signal, a mechanism for detecting the vehicle running condition, and a control unit for outputting the hydraulic pressure signal to the control valve based on the vehicle running condition.

It is preferable that the automatic transmission comprises a drive pulley, driven pulley, V-belt for transmitting a rotation between the pulleys, and a mechanism for varying a contact radius between the pulleys and the V-belt according to the hydraulic pressure.

The details as well as other features and advantages of this invention are set forth in the remainder of the specification and are shown in the accompanying drawings.

BRIEF DESCRIPTION OF THE DRAWINGS

FIG. 10 is a block diagram of a speed change ratio controller of the continuously variable transmission.

DESCRIPTION OF THE PREFERRED EMBODIMENTS

Figure 1:
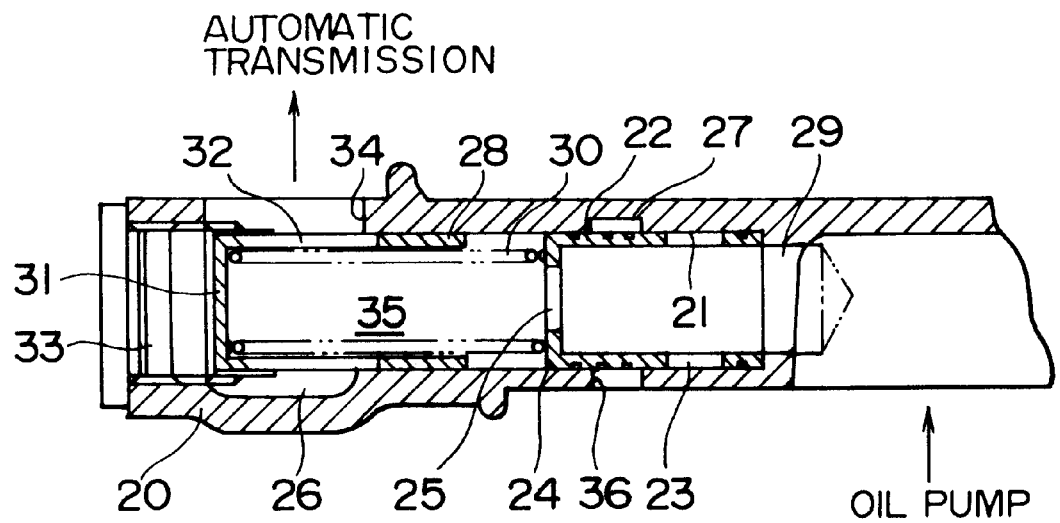
FIG. 1 is a vertical cross-sectional view of a flow rate control valve according to a first embodiment of this invention.

Referring to FIG. 1 of the drawings, a casing 20 of a flow rate control valve is provided with a cylindrical slide chamber 21, and a cylindrical spool 22 is housed in this chamber 21. Hydraulic fluid from an oil pump, not shown, is led to the inside of the spool 22 via a passage 29.

The spool 22 comprises a plurality of drain holes 23 of a predetermined size formed at equidistant intervals in a circumferential direction. An orifice 25 of predetermined diameter is formed in an end surface at one end of the spool 22.

Figure 2:
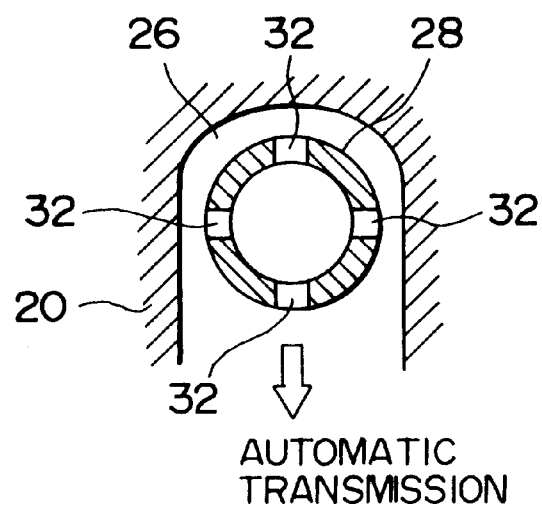
FIG. 2 is a horizontal cross-sectional view of the flow rate control valve.

A groove 26 is formed at one end of the slide chamber 21. As shown in FIG. 2, the groove 26 is formed by enlarging the diameter of the slide chamber 21, and an outflow port 34 leading to an automatic transmission, not shown, is formed continuously with the groove 26 in the casing 20.

A groove 27 is also formed at a predetermined position of the slide chamber 21 corresponding to the drain holes 23 of the spool 22. When the spool 22 is in an initial position shown in FIG. 1, this predetermined position is slightly downstream from the drain holes 23, i.e., closer to the groove 26. The groove 27 is connected to an intake port of the oil pump via a drain port 36 formed in the casing 20.

The groove 27 and the drain port 36 form part of a drain passage, which recycles part of the hydraulic fluid led into the spool 22, to the intake port of the oil pump.

A stopper 28 is housed in the slide chamber 21 for preventing the spool 22 from moving beyond a fixed position. The stopper 28 is cylindrical with a base, this base 31 being supported by a plug 33, which seals the slide chamber 21 in the vicinity of the groove 26.

A coil spring 30 is interposed between the base of the stopper 28 and the spool 22. This coil spring is disposed on the inner circumference of the stopper 28, comes in contact with the spool 22 in the vicinity of the orifice 25, and pushes the spool 22 away from the stopper 28.

A plurality of openings 32 are formed in the stopper 28 at positions corresponding to the groove 26. The orifice 25 and outflow port 34 are constantly connected via a passage 35 inside the stopper 28.

The length of the stopper 28 is set so that the overlap between the drain holes 23 and groove 27 is maximized when the spool 28 has moved to a position where it is in contact with the stopper 28. In other words, this is the position beyond which the overlap between the drain holes 23 and groove 27 decreases again.

According to the above construction, when the discharge flow rate of the oil pump is relatively low, hydraulic fluid led into the passage 29 from the oil pump flows inside the spool 22, flows into the groove 26 via the orifice 25 and opening 32, and is sent to the automatic transmission from the outflow port 34.

Figure 3:
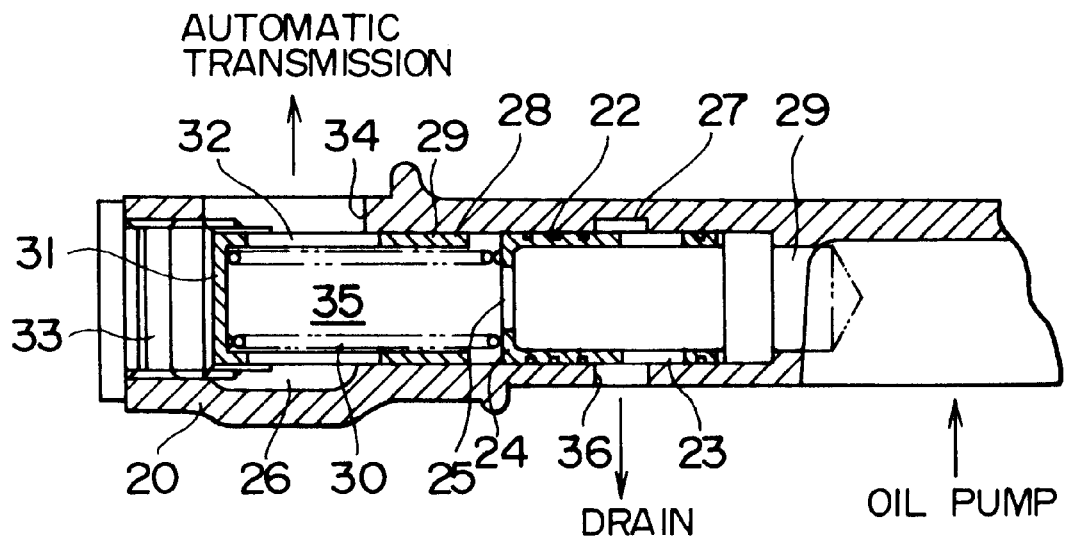
FIG. 3 is a vertical cross-sectional view of the flow rate control valve in an intermediate position.

When the discharge pressure of the oil pump increases and the pressure difference across the orifice increases, the spool 22 slides inside the slide chamber 21 towards the stopper 28 as shown in FIG. 3 against the force of the spring 30. As a result, the drain holes 23 connect with the groove 27, so part of the hydraulic fluid in the slide chamber 21 is recycled from the drain port 36 to the intake port of the oil pump via the drain holes 23 and groove 27.

In this state, the spool 22 slides towards the stopper 28 according to the increased discharge flow rate of the oil pump, and as the overlap between the drain holes 23 and groove 27 increases, the drain flow rate also increases. Therefore, although the flow rate of hydraulic fluid from the orifice 25 slightly increases, the rate of increase is suppressed to a low level.

Figure 4:
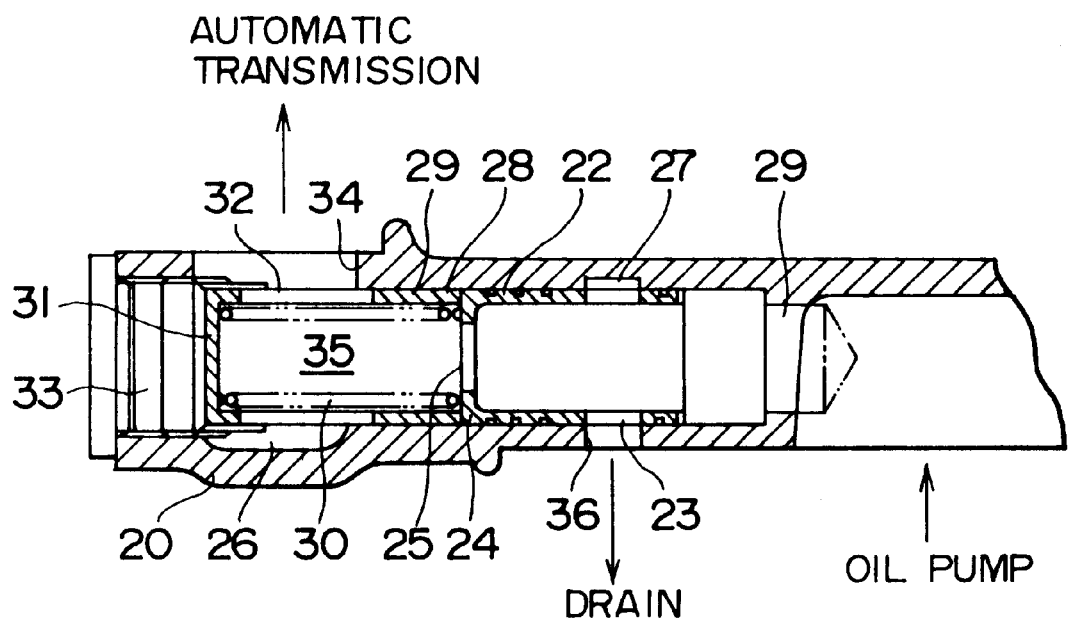
FIG. 4 is a vertical cross-sectional view of the flow rate control valve in a maximum stroke position.

When the discharge flow rate of the oil pump increases further, the displacement of the spool 22 also increases further, and the spool 22 eventually comes in contact with the stopper 28 as shown in FIG. 4. In this position, the overlap between the drain holes 23 and groove 27 is maximized. Hence even if the discharge pressure of the oil pump increases further, any further displacement of the spool 22 is limited, and the overlap between the drain holes 23 and groove 27, i.e., the drainage capacity of the flow control valve, is held at a maximum. By maintaining maximum drainage capacity in this way, the rate of increase of the flow rate through the orifice 25 is kept low even when the pump discharge pressure rises to a higher level.

Conversely, when the discharge pressure of the oil pump decreases, the spool 22 recedes, and the overlap between the drain holes 23 and groove 27 also decreases. Consequently, the drain flow rate decreases, and the flow rate through the orifice 25 decreases at the same rate as when it increased.

In this flow rate control valve, the slide direction of the spool 22 fully corresponds with the increase/decrease direction of the overlap between the drain holes 23 and groove 27. This means that there is only one slide position of the spool corresponding to a given pump discharge flow rate. As a result, there is no difference in the position of the spool 22 whether the discharge flow rate of the oil pump is increasing or decreasing, and there is no hysteresis in the flow rate characteristics.

Figure 5:
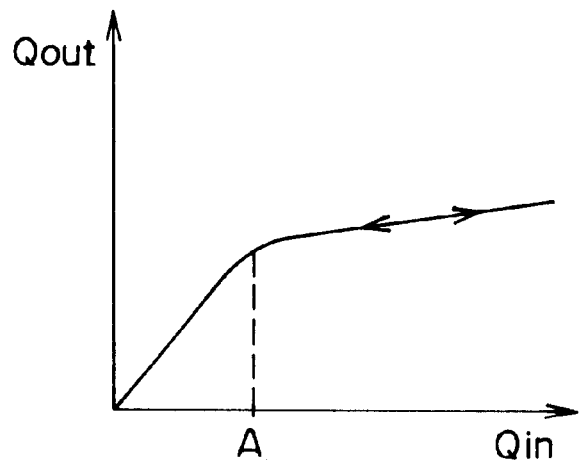
FIG. 5 is a graph showing flow rate characteristics of the flow rate control valve.

Due to the above construction, the flow rate control valve has the flow rate characteristics shown in FIG. 5. The flow rate Qout of the outflow port 34 increases in the same proportion as Qin until the drain holes 23 and groove 27 start to overlap at the point A.

After the drain holes 23 and groove 27 start to overlap, the rate of increase is very gradual, and the fluctuation of Qout is suppressed so that is lies within a narrow range even when the inflow flow rate Qin largely fluctuates. Also as hysteresis is not produced as mentioned above, the inflow flow rate Qin has the same characteristics when it is increasing as when it is decreasing as shown by the arrows in the figure.

Also in this flow rate control valve, the inner circumference of the stopper 28 and that of the spool 22 effectively have the same diameter, so diameter has substantially no effect on the flow of hydraulic fluid via the orifice, and hydraulic fluid flows smoothly from the orifice 25 to the outflow port 34.

Figure 6:
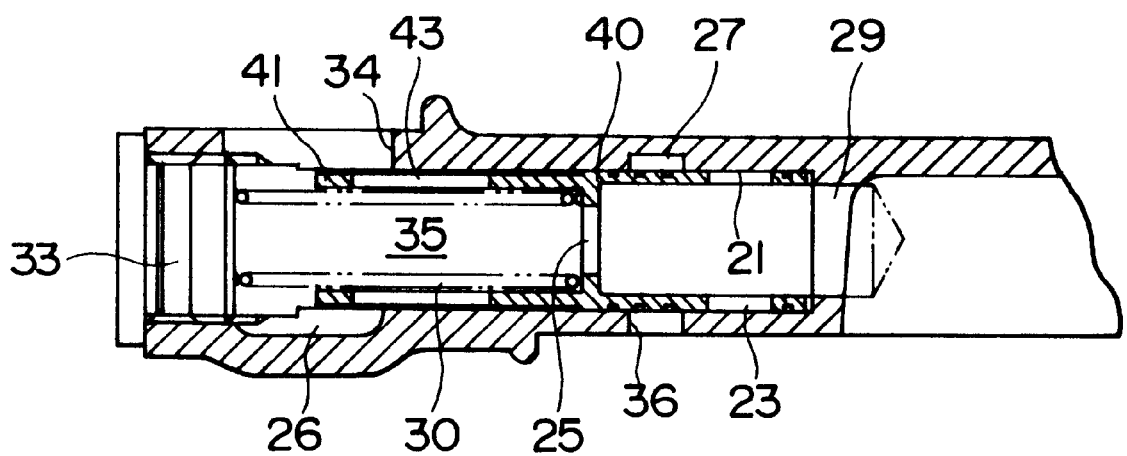
FIG. 6 is a vertical cross-sectional view of a flow rate control valve according to a second embodiment of this invention.
Figure 7:
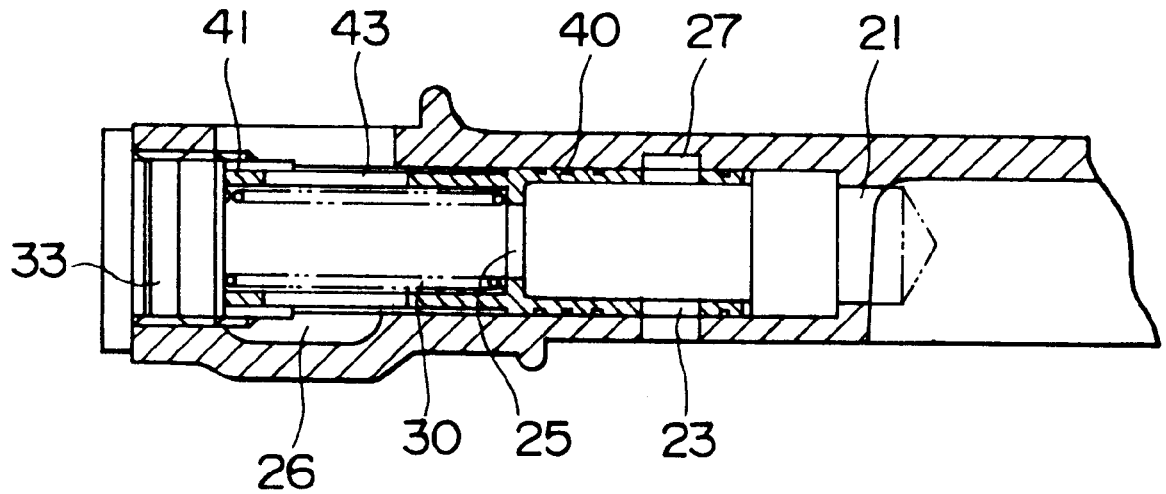
FIG. 7 is a vertical cross-sectional view of the flow rate control valve according to the second embodiment in a maximum stroke position.

FIGS. 6 and 7 show a second embodiment of this invention.

According to this second embodiment, instead of the stopper 28 of the first embodiment, a cylindrical stopper 41 is formed in a one-piece construction with a spool 40 as shown in FIG. 6. An opening 43 similar to the opening 32 of the first embodiment is formed in the stopper 41.

According to this second embodiment, the spool 40 is prevented from sliding further by the stopper 41 coming in contact with a plug 33.

Also according to this second embodiment, as in the case of the aforesaid first embodiment, sharp increases of flow rate from the outflow port 34 after the drainage capacity is maximized are prevented, and hysteresis is eliminated from the flow rate characteristics. Further according to this embodiment the stopper and spool are formed in a one-piece construction, so the number of parts forming the flow rate control valve may be reduced.

Figure 8:
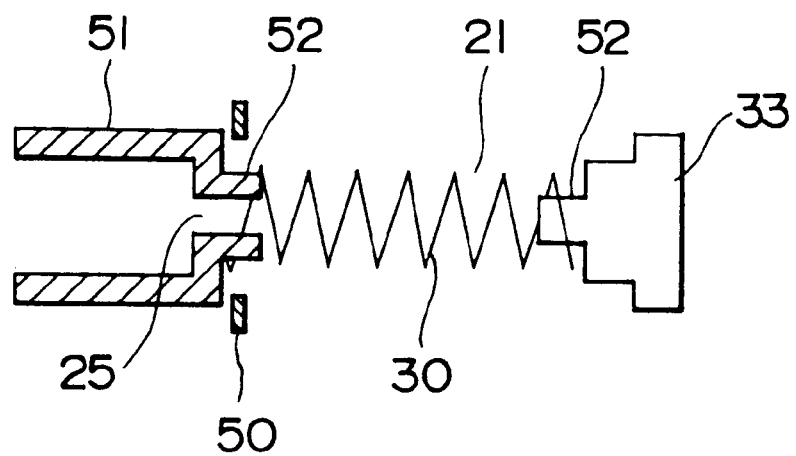
FIG. 8 is a vertical cross-sectional view of a spring support mechanism according to a third embodiment of this invention.

FIG. 8 shows a third embodiment of this invention.

According to this third embodiment, a guide 52 supporting one end of the spring 30 is formed in both a spool 51 and the plug 33.

The orifice 25 is formed so that it perforates the guide 52 of the spool 51. A snap ring 50 is further provided as a stopper. The snap ring 50 is embedded in an annular groove formed on the inner circumferential surface of the slide chamber 21, and prevents further displacement of the spool 51 by coming in contact with the spool 51. By forming the stopper as the snap ring 50, the weight of the flow rate control valve may be reduced.

Next, the application of the above flow rate control valve to a continuously variable transmission will be described with reference to FIGS. 9 and 10. Excepting for the flow rate control valve, this continuously variable transmission is disclosed in Tokkai Hei 7-259944 published by the Japanese Patent Office in 1995 and Tokkai Hei 8-178055 published by the Japanese Patent Office in 1996.

Figure 9:
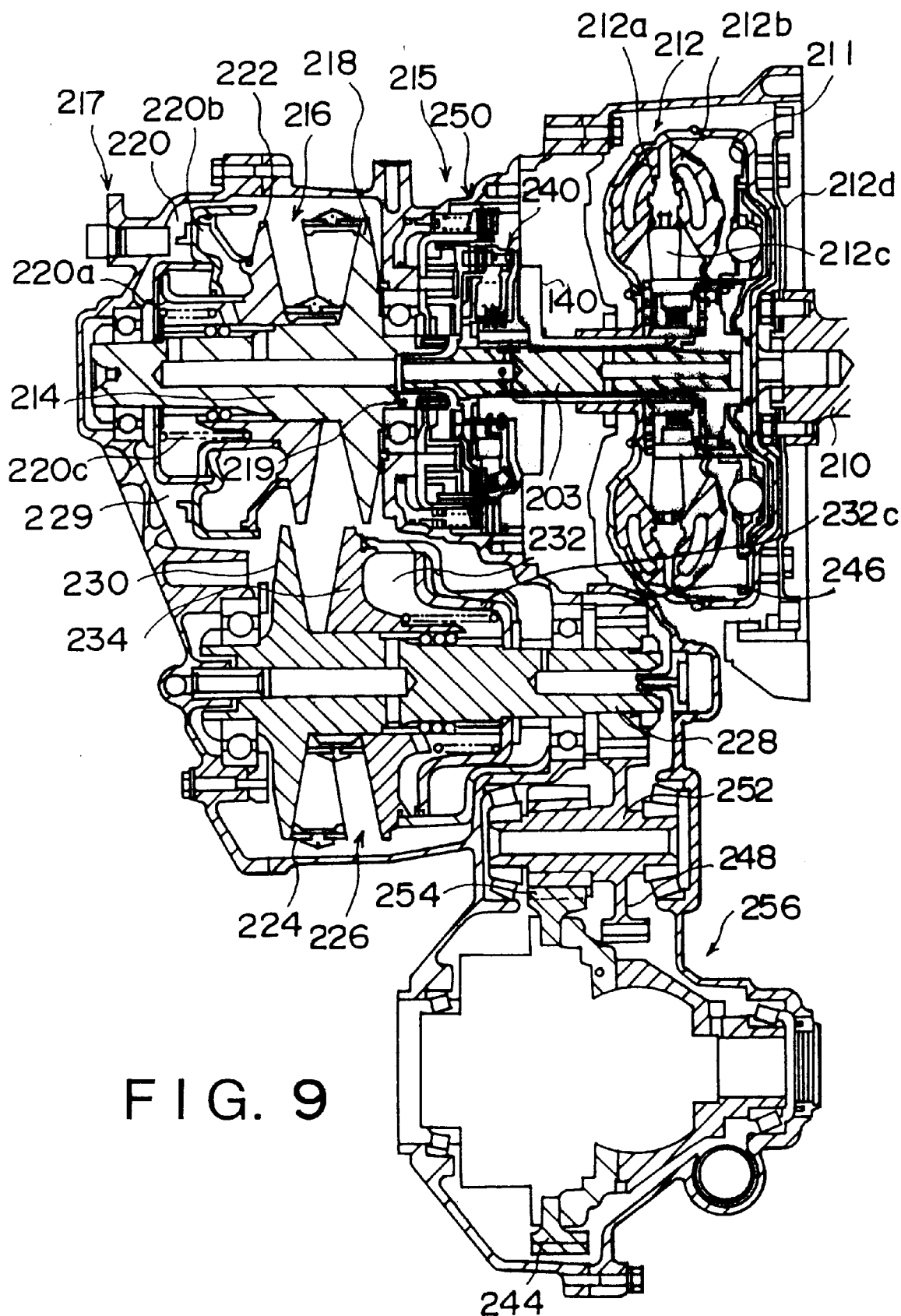
FIG. 9 is a vertical cross-sectional view of a continuously variable automatic transmission according to this invention.

Referring to FIG. 9 of the drawings, a torque converter 212 is connected to an engine output shaft 210.

The torque converter 212 comprises a lockup clutch 211. The lockup clutch 211 mechanically connects or disconnects an impeller 212a, which is an input part and a turbine 212b, which is an output part, according to the oil pressure supplied to a converter chamber 212c and a lockup oil chamber 212d.

The turbine 212b is connected to a rotation shaft 213, the rotation shaft 213 being connected to a forward/reverse change-over mechanism 215. The mechanism 215 comprises a planetary gear mechanism 219, a forward clutch 240 and a reverse brake 250. The output shaft of the mechanism 219 is connected to a drive shaft 214 formed coaxially with the rotation shaft 213. The drive shaft 214 comprises the input shaft of a continuously variable transmission (CVT) 217. It should be noted that a fluid coupling or an electromagnetic clutch may be used instead of the torque converter 212.

The CVT 217 comprises a drive pulley 216 and driven pulley 226, and a V-belt 224, which transmits the rotation of the drive pulley 216 to the driven pulley 226, as described hereinabove.

The drive pulley 216 comprises a fixed conical plate 218, which rotates together with the drive shaft 214, and a movable conical plate 222 disposed relative to the fixed conical plate 218 forming a V-shaped pulley groove with the fixed conical plate 218. The movable conical plate 222 moves in the axial direction of the drive shaft 214 according to an oil pressure acting on a drive pulley cylinder chamber 220 while it rotates with the fixed conical plate 218. The drive pulley cylinder chamber 220 comprises a chamber 220a and chamber 220b. The movable conical plate 222 has a pressure receiving surface larger that of a movable conical plate 234 described hereinafter.

The driven pulley 226 is installed on a driven shaft 228. The driven pulley 226 comprises a fixed conical plate 230, which rotates together with the driven shaft 228, and a movable conical plate 234 disposed relative to the fixed conical plate 230 forming a V-shaped pulley groove with the fixed conical plate 230. The movable conical plate 234 moves in the axial direction of the driven shaft 228 according to an oil pressure acting on a driven pulley cylinder chamber 232 while it rotates with the fixed conical plated 230.

The driven pulley 228 is provided with a drive gear 246, which rotates together with the pulley 228. The drive gear 246 engages with an idler gear 248 on an idler shaft 252. The idler shaft 252 comprises a pinion gear 254, which rotates together with the shaft 252. The pinion gear 254 engages with a final gear 244. The final gear 244 drives a propeller shaft or drive shaft, not shown, via a differential unit 256.

The rotation input to the CVT 217 from the engine output shaft 210 is transmitted to the forward/reverse change-over mechanism 215 via the torque converter 212 and rotation shaft 213. When the forward clutch 240 is engaged and the reverse brake 250 is released, the rotation of the rotation shaft 213 is transmitted to the drive shaft 214 of the CVT 217 with the same rotation direction via the planetary gear mechanism 219 whereof the input shaft and output shaft rotate together. On the other hand, when the forward clutch 240 is released and the reverse brake 250 is engaged, the rotation of the rotation shaft 213 is transmitted to the drive shaft 214 with the opposite rotation direction due to the action of the planetary gear mechanism 219.

The rotation of the drive shaft 214 is transmitted to the differential unit 256 drive pulley 216, V-belt 224, driven pulley 226, driven shaft 228, drive gear 246, idler gear 248, idler shaft 252, pinion gear 254 and final gear 244. When the forward clutch 240 and reverse brake 250 are both released, the forward/reverse change-over mechanism 215 goes into neutral, and transmission of a rotation from the rotation shaft 213 to the drive shaft 214 does not occur.

In the aforesaid dynamic transmission, the rotation ratio, i.e., speed change ratio (deceleration ratio) between the drive pulley 216 and driven pulley 226 varies when the movable conical plate 222 of the drive pulley 216 and movable conical plate 234 of the driven pulley 226 are moved in axial direction so as to alter the contact point radius with the V-belt 224. For example, if the width of the V-shaped pulley groove of the drive pulley 216 is enlarged and the width of the V-shaped pulley groove of the driven pulley 226 is narrowed, the contact point radius of the V-belt 224 on the side of the drive pulley 216 decreases and the contact point radius of the V-belt 224 on the side of the driven pulley 224 increases, so that a large deceleration ratio is obtained. When the movable conical plates 222, 234 are moved in the opposite direction, the deceleration ratio becomes smaller.

This control of the widths of the V-shaped pulley grooves of the drive pulley 216 and driven pulley 226 is performed by controlling the relative pressures of the drive pulley cylinder chamber 220 (220a, 220b) and driven pulley cylinder chamber 232 via a control system.

The hydraulic pressures of the cylinder chambers 220 and 232 shown in FIG. 9 are supplied from an oil pump 140 via a hydraulic pressure control unit 102 described hereafter and shown in FIG. 10. The oil pump 140 drives a rotation shaft 213, and pressurizes and discharges hydraulic fluid aspirated from an oil tank, not shown. A flow rate control valve according to any of the first—third embodiments is installed at the discharge port of the oil pump 140, and under predetermined engine running conditions, it supplies hydraulic fluid at a flow rate within fixed limits to the hydraulic pressure control unit 102.

The rotation ratio of the CVT 217 is controlled by the control unit shown in FIG. 210. The same symbols are used as for the mechanism in FIG. 9.

In FIG. 10, 101 is an electronic control unit comprising a microprocessor, and 102 denotes a hydraulic control unit comprising various oil pressure control valves. In this control system, the main means of controlling the aforesaid CVT are the electronic control unit 101 and the hydraulic control unit 102.

The electronic control unit 101 is a microcomputer comprising a central processing unit (CPU), read-only memory (ROM), random access memory (RAM) and an I/O interface.

Signals from a water temperature sensor S1, throttle opening sensor S2, engine rotation speed sensor S3, ABS operation sensor which detects an operation of an antilock brake system (ABS) controller 104, braking sensor S5 which detects braking of the vehicle, inhibitor switch S6 showing the operating position of a selector switch 105, rotation speed sensor S7, which detects the rotation speed of the drive pulley 216, and rotation speed sensor S8, which detects the rotation speed of the driven pulley 226, are input to the electronic control unit 101.

The electronic control unit 101 performs predetermined calculations on these signals to control the speed change ratio of the CVT 217, the line pressure and the lockup clutch 211.

Describing these functions in detail, the electronic control unit 101 outputs a drive signal to a step motor 113 so that speed change is performed according to a predetermined pattern depending on the engine load and engine rotation speed represented by the throttle opening, and the vehicle speed. The throttle opening is detected by the throttle opening sensor S2, the engine rotation speed is detected by the engine rotation speed sensor S3, and the vehicle speed is detected by the rotation speed sensor S8, which detects the rotation speed of the driven pulley 226.

The step motor 113 drives a speed change control valve 112 of a hydraulic control unit 102 so as to obtain a speed change ratio corresponding to this drive signal. The pressures of the drive pulley cylinder chamber 220 and driven pulley cylinder chamber 232 are varied relative to each other by controlling the line pressure supplied to the drive pulley cylinder chamber 220 shown in FIG. 9.

The displacement position of the drive pulley 216, i.e., the speed change ratio, is feedback controlled by the speed change control valve 112 via a link 114. After a target speed change ratio corresponding to the position of the step motor 113 is obtained, the electronic control unit 101 fixes the relative pressure of the pulley cylinder chambers 220, 232 so as to maintain the target speed change ratio.

In this speed change control of the CVT 217, when the line pressure of the pulleys 216, 226 is too small, the frictional force between the pulleys 216, 218 and V belt 224 is insufficient so that slip occurs. Conversely, when the line pressure is too large, the frictional force becomes excessively large. In either case, there is an adverse effect on the fuel consumption and power performance of the vehicle. The line pressure is therefore controlled so that the power transmitted is neither excessive nor deficient according to the driving conditions.

In other words, the electronic control unit 101 controls the position of the line pressure solenoid 115 of the oil pressure control unit 102 by the control signal output. The line pressure solenoid 115 supplies oil pressure from a hydraulic pump 140 to the driven pulley chamber 232 after the pressure is adjusted to a suitable target line pressure via a modifier (pressure control valve) 116 and regulator (constant pressure valve) 117, and also supplies oil pressure to the drive pulley cylinder chamber 220 via the speed change control valve 112.

By applying the aforesaid flow rate control valve at the discharge port of the oil pump 140, hydraulic fluid is supplied to the hydraulic pressure control unit 102 at a stable flow rate, and a highly precise speed change control can be realized.

The lockup clutch 211 is engaged when for example the vehicle speed increases beyond a predetermined value, and disengaged when the vehicle speed falls to less than this predetermined value.

The electronic control unit 101 therefore outputs a signal to the lockup solenoid 118 of the oil pressure control unit 102 according to the vehicle speed, and the lockup control valve 119 is changed over accordingly. The lockup control valve 119 is a valve that changes over between a system that supplies the oil pressure of the hydraulic pump to a converter chamber 212c of the torque converter 212 as an applied pressure of the lockup clutch 211 while releasing a lockup oil chamber 212d, and a system that supplies the oil pressure of the hydraulic pump to the lockup oil chamber 212d as a release pressure while releasing the converter chamber 212c.

The oil pressure control unit 102 is further provided with a manual control valve 120 connected to a selector lever 105. The manual control valve 120 selectively supplies oil pressure obtained from the oil pressure pump via the line pressure solenoid 115, to a forward clutch 240 and a reverse brake 250 of a forward/reverse change-over mechanism 215 according to the operating position of the selector lever 105. In this way, the forward/reverse change-over mechanism 215 is changed over between the forward, reverse and neutral positions.

The embodiments of this invention in which an exclusive property or privilege is claimed are defined as follows:

We claim:

1. A flow rate control valve for an automatic transmission for supplying a hydraulic fluid at a substantially constant flow rate to an automatic transmission by draining part of the fluid supplied form an oil pump, comprising:

a casing, a spool housed in said casing, a passage for guiding said fluid to the interior of said spool, an orifice connecting with the interior of said spool, said spool displacing inside said casing according to a hydraulic fluid pressure difference across said orifice, an outflow port connected with said orifice, said port being formed in said casing, a drain hole connecting with said passage formed in said spool, a drain passage formed in said casing so as to overlap with said drain hole according to a displacement position of said spool, a cylindrical stopper for preventing said spool from displacing beyond a position in which the overlap between said drain hole and said drain passage is a maximum, said stopper having a passage therein for connecting said orifice and said outflow port.

2. A flow rate flow rate control valve as defined in claim 1, further comprising a spring for supporting said spool against a pressure according to said pressure difference.

3. A flow rate control valve as defined in claim 2, wherein said stopper is formed in a cylindrical shape having a diameter substantially identical to a diameter of said spool and said stopper comes in contact with an end part of said spool when said drain hole and said drain passage overlap to said maximum.

4. A flow rate control valve for an automatic transmission for supplying a hydraulic fluid at a substantially constant flow rate to an automatic transmission, comprising:

a casing having a fluid passage, an outflow port, which communicates with the fluid passage, and a drain passage;

a spool housed in the casing, the spool having an axially extending orifice for passage of the fluid from the fluid passage to the outflow port, and a drain hole for bypassing a portion of the fluid from the fluid passage away from the outflow port, wherein the spool is displaceable inside the casing according to a hydraulic fluid pressure difference across the orifice, and wherein the drain passage overlaps with the drain hole according to a displacement position of the spool; and a stopper in the casing for preventing the spool from displacing beyond a position in which the overlap between the drain hole and the drain passage is at a maximum, wherein the stopper has a passage for communicating the fluid from the fluid passage to the outflow passage.

5. A flow rate control valve as defined in claim 4, wherein the stopper and the spool are integrally formed, the stopper extending in a lengthwise direction from one end of spool, and the casing includes a contact part that comes into contact with stopper when the drain hole and the drain passage overlap to the maximum.

6. A flow rate flow rate control valve as defined in claim 5, wherein the orifice is formed in the end part, said stopper comprises a passage connecting the orifice and the outflow port, said spring being disposed inside the stopper passage.

7. A flow rate control valve as defined in claim 4, wherein the stopper and the spool are both cylindrical and have substantially identical diameters, said stopper contacting an end part of the spool when the drain hole and the drain passage overlap to the maximum.

8. A flow rate control valve as defined in claim 7, further comprising a spring disposed inside the cylindrical stopper to bias the spool away from the stopper.

9. A flow rate control valve as defined in claim 7, wherein the orifice is formed at the end part of the spool facing the stopper.

10. A flow rate control valve as defined in claim 9, wherein the stopper comprises a snap ring embedded in the casing.

11. A flow rate control valve as defined in claim 10, wherein the snap ring comes into contact with the end part of the spool.

12. A flow rate control valve as defined in claim 11, wherein the end part has the orifice and a guide for supporting a spring outside the orifice.

13. A flow rate control valve as defined in claim 4, wherein the stopper is cylindrical and has a plurality of openings through a cylindrical wall thereof.

14. A flow rate control valve as defined in claim 13, further including a spring disposed in the passage for communicating the fluid from the orifice to the outflow port.

15. A continuously variable transmission apparatus for transmitting a rotation of an engine to a drive wheel of a vehicle in a ratio according to a vehicle running condition, comprising:

an automatic transmission for changing said ratio according to a hydraulic pressure, an oil pump driven by said engine, said oil pump having a discharge port for providing pressurized fluid to said transmission, a flow rate control valve fitted to said discharge port, said flow rate control valve comprising a casing, a spool housed in said casing, a passage for guiding said fluid to the interior of said spool, an orifice connecting with the interior of said spool, said spool displacing inside said casing according to a hydraulic fluid pressure difference across said orifice, an outflow port connected with said orifice, said port being formed in said casing, a drain hole connecting with said passage formed in said spool, a drain passage formed in said casing as to overlap with said drain hole according to a displacement position of said spool, and a stopper for preventing said spool from displacing beyond a position in which the overlap between said drain hole and said drain passage is a maximum, a control valve for increasing or decreasing said hydraulic pressure supplied from said flow rate control valve to said automatic transmission according to a hydraulic pressure signal, means for detecting said vehicle running condition, and a control unit for outputting said hydraulic pressure signal to said control valve based on said vehicle running condition.

16. A continuously variable transmission apparatus as defined in claim 15, wherein said automatic transmission comprises a drive pulley, a driven pulley, a V-belt for transmitting a rotation between said pulleys, and a mechanism for varying a contact radius between said pulleys and said V-belt according to said hydraulic pressure.

* * * * *